United States Patent
Mössner

(10) Patent No.: US 9,910,418 B2
(45) Date of Patent: Mar. 6, 2018

(54) METHOD AND PROGRAMMING SYSTEM FOR PROGRAMMING AN AUTOMATION COMPONENT

(75) Inventor: Rudolf Mössner, Burglengenfeld (DE)

(73) Assignee: Siemens Aktiengesellschaft, Munich (DE)

(*) Notice: Subject to any disclaimer, the term of this patent is extended or adjusted under 35 U.S.C. 154(b) by 394 days.

(21) Appl. No.: 13/535,093

(22) Filed: Jun. 27, 2012

(65) Prior Publication Data

US 2013/0006398 A1    Jan. 3, 2013

(30) Foreign Application Priority Data

Jun. 28, 2011   (EP) .................................. 11005250

(51) Int. Cl.
G05B 19/42      (2006.01)
G05B 19/042     (2006.01)
G06F 9/45       (2006.01)

(52) U.S. Cl.
CPC ....... G05B 19/0426 (2013.01); G06F 8/4442 (2013.01)

(58) Field of Classification Search
CPC .... G06F 8/4442; G06F 9/3851; G06F 9/4843; G06F 9/4881; G05B 19/0426
USPC ...... 700/2, 17, 18, 19, 86, 87; 718/100, 102, 718/103, 104, 107; 717/151, 152, 153, 717/154
See application file for complete search history.

(56) References Cited

U.S. PATENT DOCUMENTS

| | | | |
|---|---|---|---|
| 5,179,702 A * | 1/1993 | Spix .......................... | G06F 8/41 711/E12.006 |
| 6,567,840 B1 * | 5/2003 | Binns et al. .................. | 718/103 |
| 6,615,318 B2 * | 9/2003 | Jarvis .................... | G06F 12/123 711/133 |
| 6,766,419 B1 | 7/2004 | Baxter | |
| 7,159,221 B1 * | 1/2007 | Willen et al. ................. | 718/104 |
| 7,167,916 B2 * | 1/2007 | Willen et al. ................. | 709/226 |
| 7,302,685 B2 * | 11/2007 | Binns et al. .................. | 718/103 |

(Continued)

FOREIGN PATENT DOCUMENTS

| | | |
|---|---|---|
| CN | 101142557 | 3/2008 |
| CN | 101145111 | 3/2008 |

OTHER PUBLICATIONS

Hutchison, Peter, "The complete Amiga 500 User guide", 2003, Seiten 1-40, XP002660445, Gefunden im Internet; URL:http://us2.aminet.net/docs/help/A500uSERgUIDE.PDF [gefunden am Oct. 3, 2011]* Seite 34, Absatz 5.4 *, Others; 2003.

*Primary Examiner* — Charles Kasenge

(74) *Attorney, Agent, or Firm* — Cozen O'Connor

(57) ABSTRACT

A method and programming system for programming an automation component of an industrial automation arrangement, the automation component being provided with at least one special main memory, such as a cache or a tightly coupled memory, with faster access, wherein a user is provided with an input option for assigning priority values to individual tasks of the automation program when creating the program, all of those program parts which are called when executing at least the task with the highest priority assigned by the user are automatically identified, and the identified program parts being permanently storable in the special main memory such that important program parts and routines are executable in a reproducible manner at high execution speed and with a short latency time.

17 Claims, 2 Drawing Sheets

(56) References Cited

U.S. PATENT DOCUMENTS

| | | | |
|---|---|---|---|
| 7,979,642 B2* | 7/2011 | Bull et al. | 711/133 |
| 8,156,481 B1* | 4/2012 | Koh et al. | 717/151 |
| 8,261,275 B2* | 9/2012 | Johnson et al. | 718/102 |
| 2001/0020291 A1* | 9/2001 | Kudukoli et al. | 717/1 |
| 2008/0065869 A1 | 3/2008 | Kim et al. | |
| 2009/0063810 A1 | 3/2009 | Garcia-Tobin | |

* cited by examiner

METHOD AND PROGRAMMING SYSTEM FOR PROGRAMMING AN AUTOMATION COMPONENT

BACKGROUND OF THE INVENTION

1. Field of the Invention

The invention relates to a method for programming an automation component of an industrial automation arrangement and to a programming system for performing the method.

2. Description of the Related Art

Programmable logic controllers (PLCs) are used to automate production plants and processes. The core of a programmable logic controller is a microprocessor-based control device that is often also referred to as a Central Processing Unit (CPU). Conventional processors or processor designs (processor cores—IPs) which are known from the PC sector or the microcontroller sector are predominantly used nowadays when implementing these central assemblies (CPUs) in the programmable logic controllers. In this case, it is possible to use both individual processors and multiprocessor systems or systems having a plurality of processor cores. A hierarchically structured memory system is generally used in powerful processor systems, where the levels "closer" to the processing unit (processors), for example, the cache memory or Tightly Coupled Memory (TCM), generally have lower storage capacities, but considerably higher access speeds and lower latency times, than the general main memory (e.g., DRAM).

The technical further development of standard processors and processor cores (IPs) is substantially shaped by target markets, such as PC technology, image processing, video processing and/or data transmission (telephony, streaming). This results in both the hardware architecture and the strategies for using the cache memories or the TCM memories in the prior art being optimized with respect to the greatest possible data throughput per unit time. In other words, the average processing time for a volume of data is usually intended to be minimized. In many conventional applications in which considerable volumes of data are processed, loops or recurring subroutine sequences are used for this purpose. Here, a cache controller or a similar processing unit records the program code that is often repeatedly run through and frequently used management data, as a result of which these program and data segments are preferably held in the cache memory or TCM memory. In this case, the use of a cache memory thus only results in the optimization of the average throughput.

In contrast, in many typical applications in automation technology in which the programmable logic controllers are used, less stringent requirements are often imposed on the average processing time or a high data throughput. Instead, a stringent requirement is imposed on the reproducibility of the run time or the delay time for particular subapplications, in which case the latter should fluctuate as little as possible, i.e., they are intended to have as little "jitter" as possible. Examples thereof are motion control applications, hydraulic regulation systems, converter controllers in power electronics and the response to asynchronous events in fast-running machines and applications. Here, the TCM memory is generally deliberately used for the reproducible execution of code or for the reproducible access to data. However, the use of a TCM memory requires exact knowledge of the hardware architecture and the manual creation of special locating rules for the code and data parts.

Therefore, the conventional methods for the programmable logic controllers and the applications implemented using the latter are either less suitable (cache memory) or require a large outlay and in-depth knowledge of the hardware used in each case (TCM memory) for their implementation.

The achievable performance in the microprocessor system is highly dependent on whether the code to be processed and the associated data are already in the fast main memory "close to the core", for example, the cache memory or the TCM memory, or are still in the comparatively slow normal main memory (usually DRAM). An entire program, i.e., an automation program, is generally larger than the fast special main memory (cache memory, TCM memory) available and the previous program flow determines which parts of the automation program and which parts of the data are in the special main memory and which parts are not. As a result, the temporal behavior of the application in general and the execution time and response time of particular functions in particular can hardly be predicted and moreover fluctuate.

This negative effect is intensified by virtue of the fact that the "jitter-critical" tasks often have a highly linear character and therefore generally do not have any local loops that are frequently run through and are preferably held by cache management devices in the special fast main memory. For PLC tasks with stringent requirements imposed on the reproducibility (for example, regulation, clock generation or response to process alarms), this fluctuating processing speed that cannot be predicted is problematic on account of "cache hit" or "cache miss" and the "jitter" occurring in this connection. Infringements of temporal requirements generally result in disruptions in the application and thus in a process or sequence to be controlled. As a result, the program run time occurring in the "worst-case" scenario, i.e., in the case of a "cache miss", must be used as a basis for dimensioning, which results in considerable performance losses even if the average values might be considerably better. It is also difficult for the user to determine the execution time for this "worst-case" scenario since the run times of a task are severely influenced by the temporal sequences in the other tasks, which relates both to an interruption in an important task and to the "past history" of the occupancy of a cache memory and the like.

SUMMARY OF THE INVENTION

It is an object of the present invention to optimally and reliably use the speed advantage of a cache memory or tightly coupled memory (TCM) for time-critical tasks.

This and other objects and advantages are achieved in accordance with the invention by a method and programming system in which a user is provided with a user interface that generally provides a convenient possibility for creating subtasks and subprograms with stringent requirements imposed on the reproducibility of the execution time and the performance, where the user is relieved of the specific knowledge of the underlying memory structure. As a result, locating rules can be easily created in a manner independent of hardware. As a result, all program parts which may be executed when executing a time-critical task are intended to permanently remain in a special fast main memory in accordance with the invention.

In accordance with the invention, in particular, a method for programming an automation component of an industrial automation arrangement is provided, where the automation component is provided with a general main memory and with at least one special main memory with faster access in comparison with the general main memory, and part of an automation program is stored in the special main memory at the run time of the automation program. In this case, a user is provided with an input option for assigning priority values to individual tasks of the automation program when creating the automation program, where a device identifies all program parts that are called or can be called when executing at least the task with the highest priority assigned by the user. The identified program parts are then permanently stored in the at least one special main memory for the duration of the execution of the automation program. The method of the invention ensures that, on the one hand, important program parts can be executed quickly by being stored in the faster special main memory. On the other hand, the execution speed of these program parts is constant because these program parts are always stored in the special main memory, with the result that a "cache miss" cannot occur. Another advantage of the method in accordance with the invention is that all program parts dependent on the prioritized task are likewise held in the special main memory, with the result that there is no need to branch to the conventional main memory when executing time-critical routines.

The object is also achieved by a programming system for creating an automation program for an automation component, where the programming system is configured to perform the method in accordance with the invention. In this case, the programming system comprises, in particular, an input option for assigning priority values or at least one priority value to a program part or a programmed function that is intended to be executed as quickly as possible and/or with a reproducible delay or latency time at the run time. The programming system also comprises a device that can be used to determine or identify all functions or program parts or program routines dependent on the selected function. The programming system, i.e., compilers, linkers and "loaders" connected to the programming system, is also configured such that the identified program parts, such as routines, are stored in the special main memory during the run time of the automation program and are permanently available there for execution. Such a programming system can be used to achieve the same advantages as those associated with the method according to the invention.

A cache memory or a tightly coupled memory is advantageously used as the special main memory. Such memory structures are connected to a microprocessor or processor core by a particularly fast interface, with the result that fast execution of the program code therein is ensured. It should be understood that other memory types which are preferred during access operations can also be used. The important factor in this case is that a decision regarding which program parts and program routines are stored in this special main memory is not made based on execution statistics or similar mechanisms, but rather the program parts prioritized by the user and, if appropriate, the program parts and operating system routines dependent on the program parts are permanently held in this special main memory. Processing routines for events, i.e., interrupt tasks or similarly important or time-critical program parts, for example, lend themselves as tasks to be prioritized. If data or data structures are accessed or required by the identified program parts, it is expedient to likewise hold the data or data structures in the special main memory if possible in order to perform this access operation at a constant and high access speed. Furthermore, the operating system routines called by the identified program parts may also be advantageously held in the special main memory if its storage capacity suffices. In one advantageous embodiment of the invention, so many program parts and associated data, beginning with the tasks with the highest priority, are moved to the special main memory until its capacity limits are reached.

Another additional possible way of achieving constant high processing speeds is to reserve at least one processor or a processor core for the identified program parts in multiprocessor systems or in systems with multicore processors.

When performing the method in accordance with the invention, use is advantageously made of a programming system which comprises an "engineering system" and thus comprises at least one editor for creating the automation program and a compiler for compiling the automation program. As a result, the information that is acquired via the input option and relates to the prioritization of program parts can be directly forwarded to the compiler and to a corresponding loading program, further advantageous measures, in addition to the abovementioned measures, namely the storage of such program parts and the resultant executable code in the special main memory, being able to be taken for these program parts. For example, in many compilers, it is thus possible either to generate particularly fast program code or, when translating the program, to place more importance on a very "compact" program code that is economical in terms of storage. Depending on the available special main memory, the compiler can accordingly translate the identified program parts such that, on the one hand, they have an execution speed that is as high as possible but, on the other hand, can be completely accommodated in the special main memory. Such a programming system advantageously has knowledge of the approximate size of the available special main memory, with the result that, even during the input option, a user can be advised of which or how many of the available program parts and routines can be prioritized and which cannot.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the method in accordance with the invention is explained below using the drawings. The exemplary embodiment is simultaneously used to explain a programming system of the invention in which.

DETAILED DESCRIPTION OF THE PREFERRED EMBODIMENTS

Figure 1:
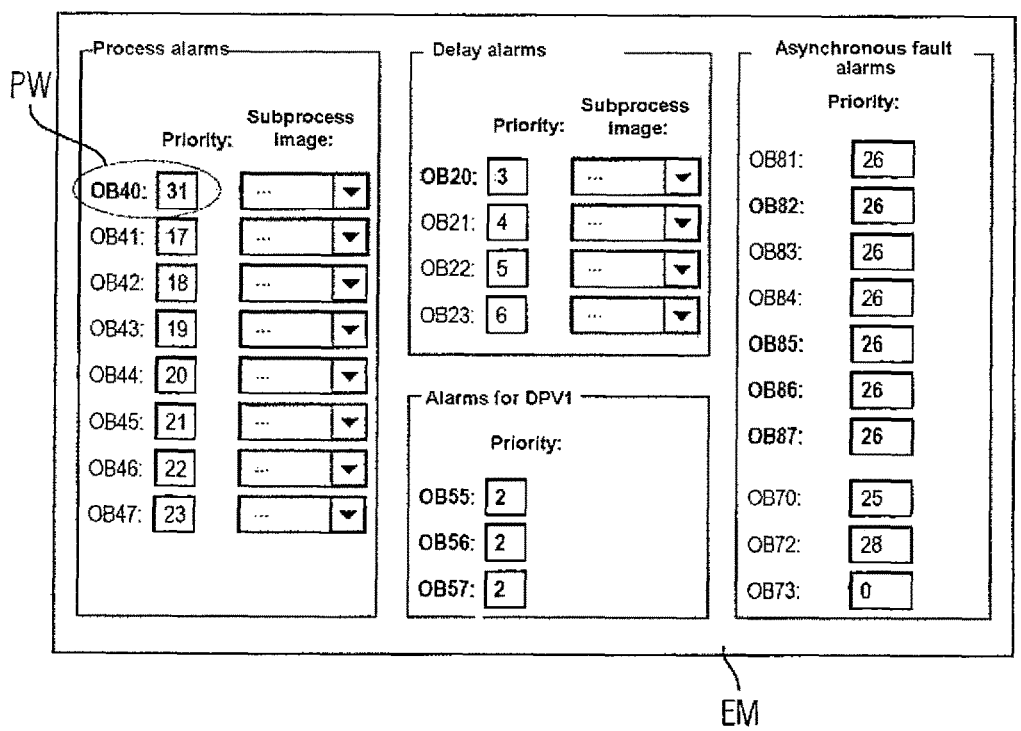
FIG. 1 is a schematic block diagram of programming system in which an input option for priority values which can be assigned to events and other program parts.
Figure 2:
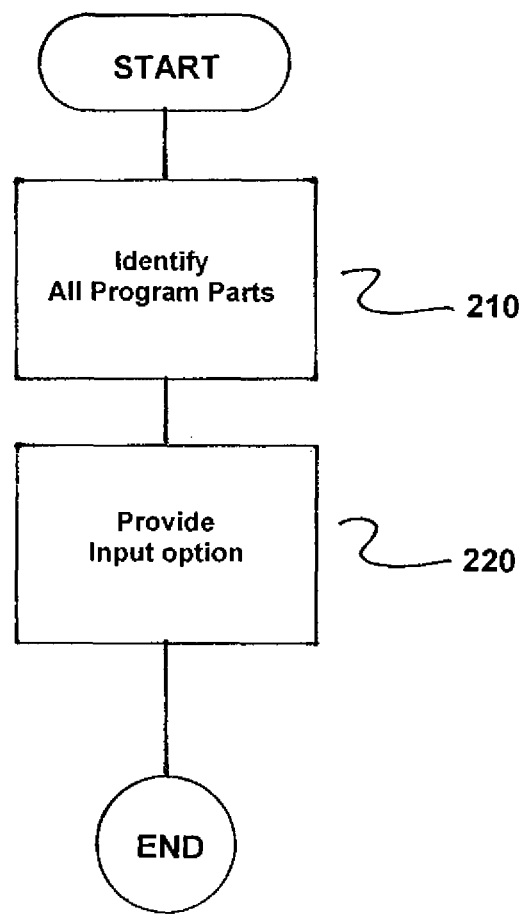
FIG. 2 is a flowchart of the method in accordance with an embodiment of the invention.

FIG. 1 shows an input option for priority values which can be assigned to events and other program parts. More particularly, FIG. 1 illustrates an input option EM which presents different program parts or tasks of an automation program, such as example process alarms, delay alarms, asynchronous fault alarms and other alarms. Each of these categories lists different program modules that are also referred to as "organizational modules" OB. A priority value PW can be assigned to each of these organizational modules OB, at least that organizational module OB with the highest priority value (here: 31)—the organizational module OB40 in the figure—being intended to be persistently stored in the special main memory.

The input option EM is thus a user interface that provides a convenient option for creating or determining PLC sub-applications with stringent requirements imposed on reproducibility and performance, the underlying real hardware being concealed to a user. The system must only have a statement of the size of the special main memory.

The user program is created in programmable logic controllers in programming systems which are usually based on a virtual machine. This programming system comprises the structuring of subtasks as "tasks", i.e., organizational modules OB. The user can assign priorities or priority values PW to the "tasks". Further code modules may be hierarchically called in the tasks, i.e., the prioritized program parts. Here, the same code module can also be used in different "tasks". The code contained in the code modules may access global or local data.

An application created by the user is translated completely or incrementally into target-platform-specific machine code with the aid of a compiler process. This compiler process can be performed in a plurality of stages. The respective stages of the compiler process can be performed both in the creation system and partially or entirely on the target platform (PLC, CPU).

The input option EM thus provides a user at the programming interface with the option of accordingly characterizing "jitter-critical tasks", for example, this being able to be performed using a settable task priority (priority value PW) or with the aid of an additional attribute (not shown). The program hierarchy is analyzed at the latest during the compiler run. The code and data parts which are part of these critical "tasks" and therefore must be intended to be stored in the special main memory are characterized on this basis.

The size of the available special main memory is advantageously stated based on a virtual memory size that is independent of the actually underlying hardware. This virtual memory statement takes into account, if appropriate, compiler factors when converting the user code to the target platform and, if appropriate, sufficient reserves for the performant execution of the throughput-oriented program parts to be prioritized or the operating system functionality to be concomitantly stored. This standardized memory size statement for the fast special main memory can be used to provide the user with a utilization display which is independent of the target hardware. The user is thus guaranteed a particular size of fast memory for "jitter-critical" program parts. Internal mapping methods and the real structure of the hardware are completely transparent to the user.

Based on the characterization of "jitter-critical" program parts, the compiler or locator (loader) can be used to automatically, permanently assign the critical program parts to the special main memory area(s) in the target platform. This reproducibly fast main memory can be effected by "locking" particular areas in the cache, by other assignment methods (e.g., cache coloring) or by locating to another fast memory area (e.g., tightly coupled memory (TCM)). During assignment, the system functions (for example, parts of the PLC operating system or of the "firmware") used from the user program may advantageously also be taken into account. As a result, only those system functions that are actually also used in the critical "tasks" permanently quickly occupy the main memory.

In addition, the characterization by the input option EM can be advantageously used to deliberately determine particular strategies for the compiler for the critical program parts, for example, optimization with respect to code size or code speed.

In another advantageous embodiment, it is possible to deliberately swap out critical program parts to an independent execution unit, for example, to configurable logic or for execution by a reserved processor or processor core. Additionally or alternatively, a method for allocating memory addresses, which makes it possible to uniformly utilize available "cache ways", can also be selected during locating, as a result of which sufficient cache resources are available for the performant execution of the throughput-oriented subtasks.

The method in accordance with the invention can be used both for textual and for graphical programming languages and a combination thereof. Here, the user is optionally intended to be given the option of excluding particular program parts, which are present in the call hierarchy of a selected critical program part, from the locating to the fast special main memory, for example, for non-critical initialization code or for non-critical error handling sequences. This can be effected by characterizing entire modules, for example, organizational modules OB, or by characterization in the source code. In contrast, the user may likewise optionally be given the option of storing particular program parts in the fast special main memory even if the program parts are not in the call hierarchy of a critical "task". This can be effected, for example, by characterizing entire organizational modules OB or by characterization in the source code. As a further option, the method can also be implemented such that no negative effects on the temporal stability also arise, as a result of reloading in the "run" operating state, if the necessary resources have already been taken into account in the virtual memory statement.

In one advantageous embodiment, not only program code but also data areas may be taken into account during analysis and locating. In another advantageous embodiment, a plurality of different special main memory areas with different assigned speed classes may also be specified and taken into account.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for programming an automation component of an industrial automation arrangement, the automation component of the industrial automation arrangement being provided with a general main memory and with at least one special main memory with faster access than the general main memory, and part of an automation program being stored in the at least one special main memory having the faster access than the general main memory at run time of the automation program, the method comprising:

provided a user with an input option for assigning priority values to individual tasks of the automation program when creating the automation program such that parts of the automation program become identified for storage in the at least one special main memory having the faster access than the general main memory at run time of the automation program; and identifying, by a device, all program parts which are one of called and callable when executing at least a task of the individual tasks having a highest priority assigned by the user;

wherein the identified program parts are permanently stored in the at least one special main memory of the automation component of the industrial automation arrangement based on the assigned priority values during execution of the automation program.

2. The method as claimed in patent claim 1, wherein the at least one special main memory having the faster access than the general main memory comprises one of a cache memory and a tightly coupled memory.

3. The method as claimed in one claim 1, wherein at least one processing routine for an event is selectable as the task to be assigned the highest priority.

4. The method as claimed in claim 1, wherein at least part of data accessed by the identified program parts are also held in the at least one special main memory having the faster access than the general main memory at the run time of the automation program.

5. The method as claimed in claim 1, wherein at least part of operating system routines called by the identified program parts are also held in the at least one special main memory having the faster access than the general main memory.

6. The method as claimed in claim 1, wherein the automation program is executable on a hardware platform having one of a plurality of processors and at least one multicore processor, the identified program parts being executable on one of:

a reserved one of the plurality of processors; and
a reserved core of the at least one multicore processor.

7. The method as claimed in claim 1, wherein an engineering system is used for programming and comprises at least one editor for creating the automation program and a compiler for compiling the automation program.

8. The method as claimed in claim 7, wherein the compiler designates executable program code which results from the identified program parts such that a loading program on a hardware platform loads the executable program code which results from the identified program parts into the at least one special main memory having the faster access than the general main memory.

9. A programming system for creating an automation program of an industrial automation component of an industrial automation arrangement, comprising:

a general main memory;
at least one special main memory faster access than the general main memory; and
an input option for assigning priority values to individual tasks of the automation system based on a user input such that parts of the automation program become identified for storage in the at least one special main memory having the faster access than the general main memory at run time of the automation program;
wherein the programming system is configured to identify all program parts which are one of called and callable when executing a task assigned a highest priority value of the priority values assigned using the input option; and
wherein the programming system is configured such that the identified program parts are permanently storable in the at least one special main memory of the automation component of the industrial automation arrangement based on the assigned priority values for a duration of an execution of the automation program.

10. The programming system as claimed in patent claim 9, wherein the at least one special main memory having the faster access than the general main memory is configured to address a cache memory or a tightly coupled memory.

11. The programming system as claimed in claim 9, wherein the input option (EM) is configured to select an event processing routine as a task to be prioritized.

12. The programming system as claimed in claim 10, wherein the input option (EM) is configured to select an event processing routine as a task to be prioritized.

13. The programming system as claimed in claim 9, wherein the programming system is configured such that at least part of the data accessed by the identified program parts are also held in the at least one special main memory having the faster access than the general main memory at run time of the automation program.

14. The programming system as claimed in claim 9, wherein the programming system is configured such that at least a part of operating system routines called by the identified program parts are identified and held in the at least one special main memory having the faster access than the general main memory for a duration of program execution.

15. The programming system as claimed in claim 9, wherein the programming system creates executable program code for target hardware having one of a plurality of processors and at least one multicore processor, the programming system being configured such that the identified program parts are executable on one of:

a reserved one of the plurality of processors; and
a reserved core of the at least one multicore processor.

16. The programming system as claimed in claim 9, wherein the programming system comprises at least one editor for creating the automation program and a compiler for compiling the automation program.

17. The programming system as claimed in claim 9, wherein the programming system is configured to create instructions for a loading program on target hardware, the instructions comprising loading of the identified program parts into the at least one special main memory having the faster access than the general main memory.

* * * * *